(12) United States Patent
Ferguson et al.

(10) Patent No.: US 9,585,480 B2
(45) Date of Patent: Mar. 7, 2017

(54) SYSTEMS AND METHODS FOR RECLINING SEATS

(71) Applicant: AMI INDUSTRIES, INC., Colorado Springs, CO (US)

(72) Inventors: Keith M. Ferguson, Colorado Springs, CO (US); Douglas E. Hoover, Colorado Springs, CO (US)

(73) Assignee: AMI INDUSTRIES, INC., Colorado Springs, CO (US)

( * ) Notice: Subject to any disclaimer, the term of this patent is extended or adjusted under 35 U.S.C. 154(b) by 259 days.

(21) Appl. No.: 14/273,984

(22) Filed: May 9, 2014

(65) Prior Publication Data

US 2015/0320216 A1    Nov. 12, 2015

(51) Int. Cl.
*A47C 1/032* (2006.01)
*A47C 3/00* (2006.01)
*B60N 2/22* (2006.01)
*B64D 11/06* (2006.01)

(52) U.S. Cl.
CPC .......... *A47C 1/03294* (2013.01); *A47C 1/032* (2013.01); *A47C 3/00* (2013.01); *B60N 2/2209* (2013.01); *B64D 11/064* (2014.12)

(58) Field of Classification Search
CPC .............................. A47C 1/03294; A47C 1/032
USPC .................................................. 297/342, 318
See application file for complete search history.

(56) References Cited

U.S. PATENT DOCUMENTS

| | | | |
|---|---|---|---|
| 3,913,152 A * | 10/1975 | Quakenbush ...... | A47C 17/1756 297/318 X |
| 5,570,927 A * | 11/1996 | LaPointe ............. | A47C 1/0355 297/318 X |
| 5,785,384 A | 7/1998 | Sagstuen | |
| 6,030,043 A | 2/2000 | Habedank | |
| 6,305,644 B1 | 10/2001 | Beroth | |
| 6,394,549 B1 | 5/2002 | DeKraker et al. | |
| 7,195,316 B2 | 3/2007 | Shimasaki et al. | |
| 8,113,573 B2 | 2/2012 | Lawson | |
| 8,201,876 B2 | 6/2012 | Dowty et al. | |
| 8,403,415 B2 | 3/2013 | Lawson | |
| 8,534,759 B2 | 9/2013 | De La Garza et al. | |
| 8,579,375 B2 | 11/2013 | Marais et al. | |
| 2006/0055214 A1 | 3/2006 | Serber | |

FOREIGN PATENT DOCUMENTS

| | | |
|---|---|---|
| EP | 0320478 | 6/1989 |
| EP | 2581260 | 4/2013 |
| WO | 2012043118 | 4/2012 |

OTHER PUBLICATIONS

Extended European Search Report dated Oct. 1, 2015 in European Application No. 15166756.5.

* cited by examiner

*Primary Examiner* — Anthony D Barfield

(74) *Attorney, Agent, or Firm* — Snell & Wilmer, L.L.P.

(57) ABSTRACT

Systems and methods are disclosed herein for reclining seats. A seat may have a seat back, a seat bottom, and a spine within the seat back and seat bottom. The seat bottom may be coupled to a base. The seat bottom may translate relative to the base. The seat may include a guide ramp coupled to the base. A portion of the spine may be located within the guide ramp. In response to translation of the seat bottom, the guide ramp may apply a torque on the spine, causing the seat back to recline.

14 Claims, 2 Drawing Sheets

SYSTEMS AND METHODS FOR RECLINING SEATS

FIELD

The present disclosure relates generally to seats. More particularly, the present disclosure relates to reclining seats.

BACKGROUND

Many seats recline for user comfort or other purposes. Typically, the seat back may recline as the seat bottom remains in a fixed position. However, certain situations do not allow the seat back to recline, such as when the seat back is positioned against a wall. In such situations, external mechanisms, such as a 4-bar linkage may be used to assist in reclining.

SUMMARY

A seat is disclosed. The seat may comprise a base, a guide ramp, a seat bottom, a seat back, and a spine. The guide ramp may be coupled to the base. The guide ramp may comprise a guide channel. The seat bottom may be coupled to the base via a sliding mechanism. The seat back may be pivotably coupled to the seat bottom. The spine may be located at least partially within the seat back and the seat bottom. A portion of the spine may be located within the guide channel.

In various embodiments, the guide channel may be positioned at an angle relative to a direction of translation of the seat bottom. The seat may comprise a return spring coupled to a portion of the base and a portion of the seat bottom. The seat back may be configured to recline in response to forward translation of the seat bottom. The spine may comprise a cam roller located within the guide channel. The spine and the guide ramp may be located within the seat back and the seat bottom. A forward end of the guide ramp may be located at a greater vertical distance from the base than an aft end of the guide ramp. The guide ramp may be configured to apply a torque on the spine.

A seat is disclosed. The seat may comprise a seat back, a seat bottom, and a base. The base may comprise a guide ramp. The seat back may be configured to recline in response to the seat bottom translating relative to the base.

In various embodiments, the seat may comprise a spine. A first portion of the spine may be located within the seat back, and a second portion of the spine may be located within the seat bottom. The spine may comprise a cam follower. The guide ramp may be configured to apply a torque on the cam follower in response to the seat bottom translating relative to the base. The torque may cause the seat back to recline. The seat may comprise a locking mechanism configured to prevent translating of the seat bottom. The guide ramp may comprise a guide channel. The seat may comprise a spine having a cam roller located within the guide channel. The seat may comprise a return spring configured to return the seat to an upright position.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Systems and methods are disclosed herein for a reclining seat. The seat may comprise a spine within the seat back and the seat bottom. The spine may be configured to rotate about a pivot in the seat bottom. A cam follower at a forward end of the spine in the seat bottom may be located within a guide ramp. The seat bottom may be configured to translate relative to a fixed base. A user may cause the seat bottom to translate forward. As the seat bottom translates forward, the cam follower may follow the path of the guide ramp. The path of the guide ramp may force the spine to rotate about the pivot, causing the seat back to recline.

Figure 1:
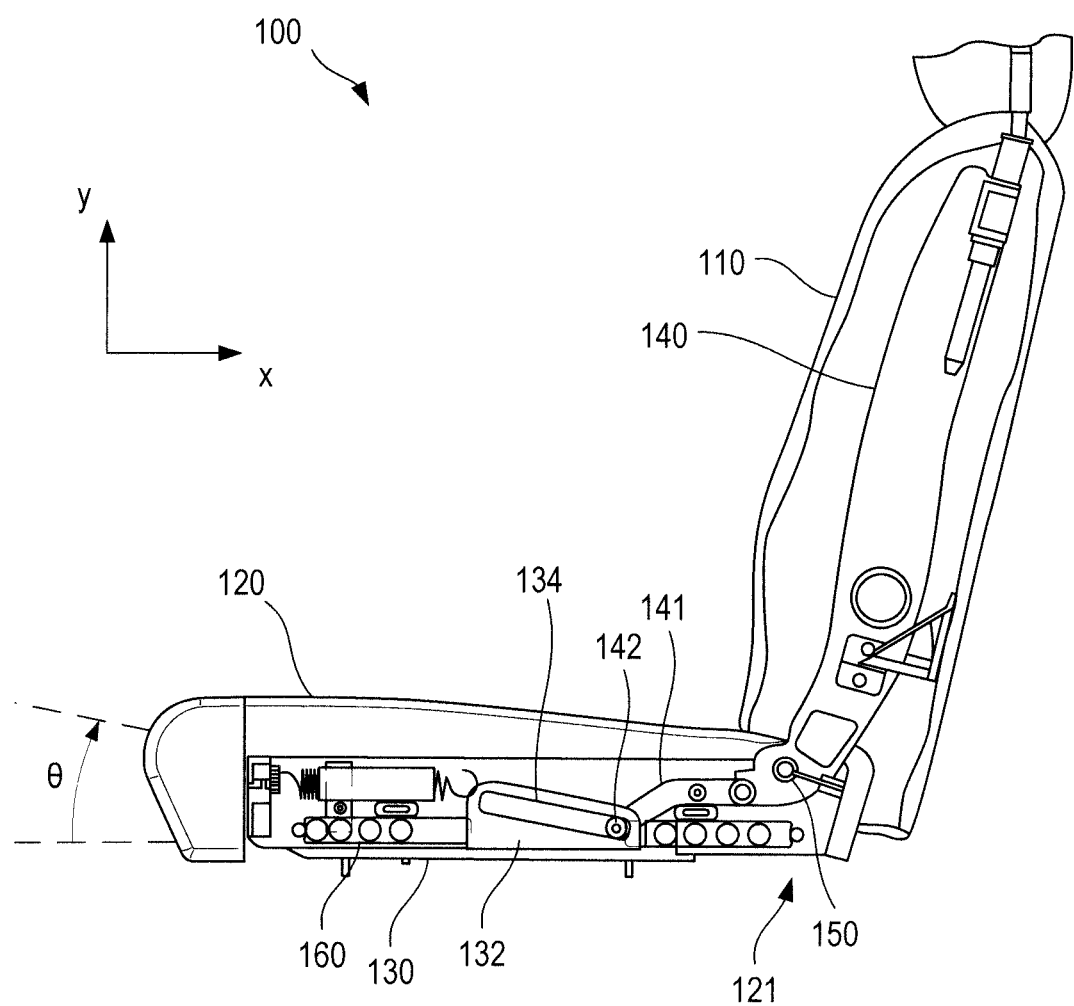
FIG. 1 illustrates a seat in an upright position according to various embodiments.

Referring to FIG. 1, a seat 100 is illustrated in an upright position according to various embodiments. X-y axes are shown for ease of illustration, with forward representing the negative x-direction, and up representing the positive y-direction. In various embodiments, seat 100 may be a seat for an aircraft. However, those skilled in the art will recognize that the mechanisms discussed herein may be compatible with any type of reclining seat. Seat 100 may comprise a seat back 110 and a seat bottom 120. Seat bottom 120 may be located within a base 130. Base 130 may be fixed to the surrounding environment, such as fixed to a floor beneath seat 100 or a wall adjacent to seat 100.

Seat 100 may comprise a spine 140. Spine 140 may be located at least partially within seat back 110, and at least partially within seat bottom 120. Spine 140 may comprise a rigid material, such as aluminum or a rigid plastic. Spine 140 may be fixed relative to seat back 110, Thus, as spine 140 reclines, seat back 110 reclines as well. Spine 140 may comprise a cam follower 141. In various embodiments, spine 140 may comprise a unitary component. However, in various embodiments, spine 140 may comprise a plurality of components which are coupled together. Spine 140 may be configured to rotate about a pivot 150. Pivot 150 may be coupled to an aft end 121 of seat bottom 120. Thus, as spine 140 rotates about pivot 150, seat back 110 may rotate relative to seat bottom 120.

Seat bottom 120 may be configured to translate fore and aft relative to base 130. In various embodiments, seat bottom 120 may be coupled to base 130 via a sliding mechanism 160. Seat bottom 120 may be coupled to base 130 via any type of mechanism which allows seat bottom 120 to translate fore and aft relative to base 130, such as mechanisms which include ball bearings or low friction surfaces such as silicone or polytetrafluoroethylene.

Seat 100 may comprise a guide ramp 132 coupled to base 130. Guide ramp 132 may be configured to remain in a fixed position relative to base 130 as seat bottom translates fore and aft. Guide ramp 132 may comprise a guide channel 134. Guide channel 134 may be positioned at an angle θ relative to a direction of translation of seat bottom 120. A portion of cam follower 141 may be located within guide channel 134. In various embodiments, cam follower 141 may comprise a cam roller 142 which is located within guide channel 134. In response to seat bottom 120 translating in a forward direction, cam roller 142 may follow the path of guide channel 134. Guide channel 134 may force cam roller 142 to move away from base 130 in the positive y-direction as seat bottom 120 translates forward. The upward movement of cam roller 142 causes spine 140 to rotate about pivot 150 via cam follower 141. Thus, as seat bottom 120 is translated forward, seat back 110 is forced to recline.

Figure 2:
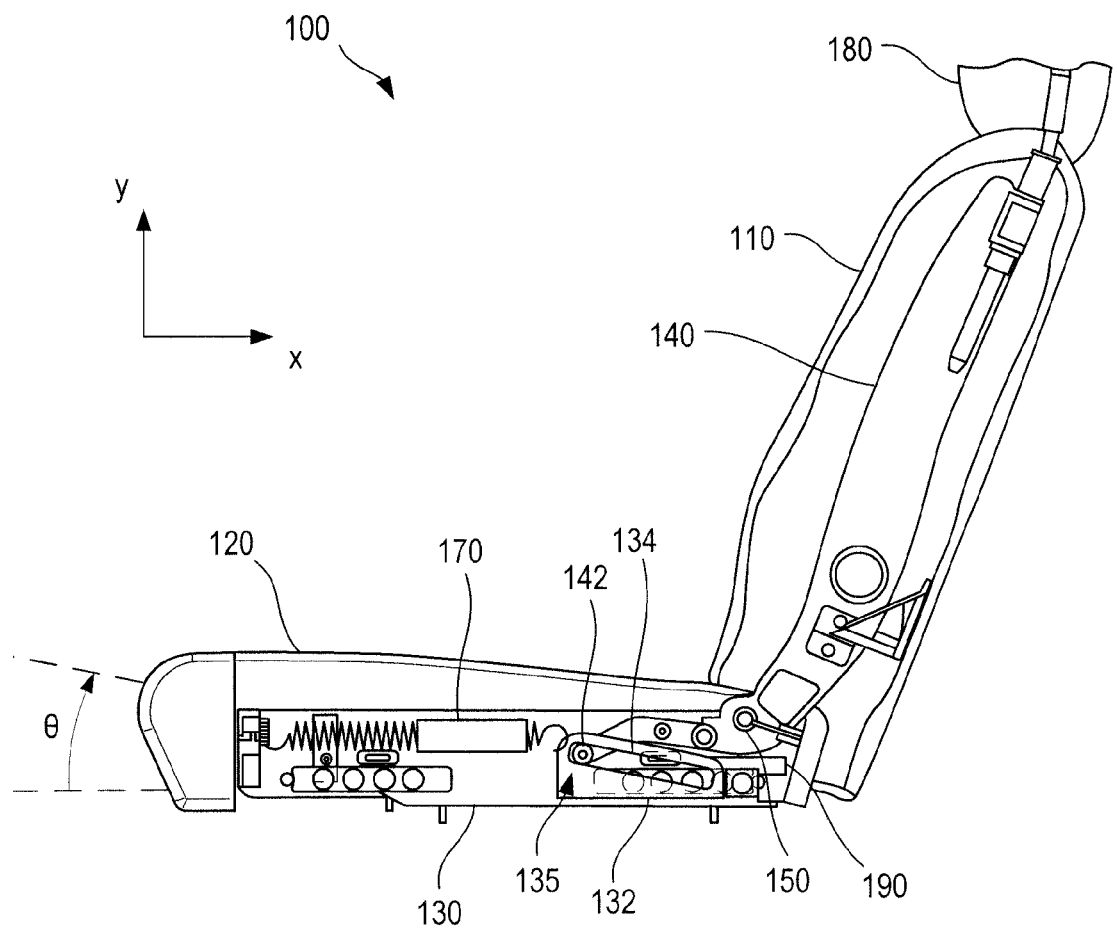
FIG. 2 illustrates a seat in a reclined position according to various embodiments.

Referring to FIG. 2, seat 100 is illustrated in a reclined position according to various embodiments. In comparison to the upright position shown in FIG. 1, seat bottom 120 has been translated in a forward direction relative to base 130. As seat bottom 120 is translated in the forward direction, seat back 110 and spine 140 are also translated in the forward direction. Cam roller 142 has been translated to a forward end 135 of guide channel 134, which creates a torque on spine 140 about pivot 150, causing seat back 110 to recline.

Seat 100 may comprise a return spring 170. Return spring 170 may be coupled to a fixed portion of seat 100, such as guide ramp 132, and a translating portion of seat 100, such as a portion of seat bottom 120. In response to seat bottom 120 translating to the forward position shown in FIG. 2, return spring 170 may extend (or in various embodiments, a spring may compress). Thus, absent a counteracting force, return spring 170 may cause seat bottom 120 to translate in the aft direction and seat 100 to return to the upright position.

As illustrated, guide channel 134 is linear and positioned at an angle θ of approximately 10° relative to the direction of translation of seat bottom 120. However, in various embodiments, guide channel 134 may be positioned at other angles. As the angle θ is increased, back rest 110 will recline further with the same amount of forward translation of seat bottom 120. In various embodiments, guide channel 134 may be curved or have complex shapes, such that the ratio of forward movement to seat back declination changes as seat bottom 120 is translated fore and aft. In various embodiments, seat back 110 may fully recline, such that seat 100 may be used as a bed. In various embodiments, guide ramp 132 may be configured such that head rest 180 does not substantially translate as seat bottom 120 translates. Thus, a user's head may remain in a substantially fixed position relative to surrounding objects, which may include televisions, eating trays, work surfaces, windows, etc.

In various embodiments, seat 100 may comprise a locking mechanism 190 which maintains seat 100 in the upright or reclined position and prevents undesired translating of seat bottom 120. A user may unlock the locking mechanism 190 and cause seat 100 to recline by forcing the seat bottom 120 forward with the user's legs, or by applying rearward pressure on seat back 110 with the user's back. To return seat 100 to the upright position, the user may unlock the locking mechanism 190 and return spring 170 may bring seat 100 back to the upright position. In various embodiments, locking mechanism 190 may comprise a pinch spring coupled to base 130, or otherwise fixed relative to base 130. Pinch spring may be configured to tightly bind around a rod which translates with seat bottom 120. In response to a user unlocking the locking mechanism 190, such as by pressing a button, the pinch spring may loosen around the rod, allowing the rod and seat bottom 120 to translate forward and aft. In response to the user locking the locking mechanism 190, such as by releasing the button, the pinch spring may tighten around the rod, locking seat bottom 120 in place. Those skilled in the art will appreciate that many different types of locking mechanisms may be consistent with the present disclosure.

In various embodiments, seat 100 may be powered, such as by an electric motor or a hydraulic system. The motor may cause seat bottom 120 to translate fore and aft, and the interaction between cam follower 141 and guide ramp 132 may cause seat back 110 to recline.

In various embodiments, spine 140 and guide ramp 132 may be fully enclosed within seat back 110 and seat bottom 120. Thus, spine 140 and guide ramp 132 may not be visible to a user. Thus, the reclining mechanism may be more aesthetically pleasing or contain fewer exposed parts which may interfere with users or other people or objects in the area of seat 100.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic, Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A seat comprising:
   a base;
   a guide ramp coupled to the base, wherein the guide ramp comprises a guide channel;
   a seat bottom coupled to the base via a sliding mechanism;
   a seat back pivotably coupled to the seat bottom about a pivot fixed on the seat bottom, wherein the guide channel is located forward of the pivot; and
   a spine located at least partially within the seat back and the seat bottom, wherein a portion of the spine is located within the guide channel, wherein the spine is a unitary component formed as a single piece, and wherein the portion of the spine located within the guide channel is configured to rotate about the pivot.

2. The seat of claim 1, wherein the guide channel is positioned at an angle relative to a direction of translation of the seat bottom.

3. The seat of claim 1, further comprising a return spring coupled to a portion of the base and a portion of the seat bottom.

4. The seat of claim 1, wherein the seat back is configured to recline in response to forward translation of the seat bottom.

5. The seat of claim 1, wherein the spine comprises a cam roller located within the guide channel.

6. The seat of claim 1, wherein the spine and the guide ramp are located within the seat back and the seat bottom.

7. The seat of claim 1, wherein a forward end of the guide ramp is located at a greater vertical distance from the base than an aft end of the guide ramp.

8. The seat of claim 1, wherein the guide ramp is configured to apply a torque on the spine.

9. A seat comprising:
   a seat back;
   a seat bottom;
   a base comprising a guide ramp;
   wherein the seat back is configured to rotate about a pivot fixed on the seat bottom and recline in response to the seat bottom translating relative to the base,
   wherein the guide ramp is located forward of the pivot; and
   a spine, wherein a first portion of the spine is located within the seat back, wherein a second portion of the spine is located within the seat bottom, wherein the first portion of the spine and the second portion of the spine form a single piece unitary component, and wherein the first portion and the second portion of the spine are configured to rotate about the pivot.

10. The seat of claim 9, wherein the spine comprises a cam follower, and wherein the guide ramp is configured to apply a torque on the cam follower in response to the seat bottom translating relative to the base.

11. The seat of claim 9, wherein the torque causes the seat back to recline.

12. The seat of claim 9, further comprising a locking mechanism configured to prevent the seat bottom from translating.

13. The seat of claim 9, wherein the guide ramp comprises a guide channel, and wherein the seat comprises a spine having a cam roller located within the guide channel.

14. The seat of claim 9, further comprising a return spring configured to return the seat to an upright position.

* * * * *